METHODS FOR THE VULCANIZING OF PREFORMED TIRES

Original Filed Jan. 29, 1965 6 Sheets-Sheet 1

Inventors
Walter Balle
Paul Musch
By
Watson Cole Grindle & Watson
Attys.

METHODS FOR THE VULCANIZING OF PREFORMED TIRES

Original Filed Jan. 29, 1965 6 Sheets-Sheet 2

Inventors
Walter Balle
Paul Musch
By
Watson, Cole, Grindle & Watson
Attys.

METHODS FOR THE VULCANIZING OF PREFORMED TIRES

Original Filed Jan. 29, 1965 6 Sheets-Sheet 5

Inventors
Walter Balle
Paul Musch
By
Watson, Cole, Grindle & Watson
Attys.

METHODS FOR THE VULCANIZING OF PREFORMED TIRES

Original Filed Jan. 29, 1965 6 Sheets-Sheet 4

Inventors
Walter Balle
Paul Musch
By
Watson Cole Grindle & Watson
Attys

METHODS FOR THE VULCANIZING OF PREFORMED TIRES

Original Filed Jan. 29, 1965 6 Sheets-Sheet 5

Inventors
Walter Balle
Paul Musch
By
Watson, Cole, Grindle & Watson
Attys.

METHODS FOR THE VULCANIZING OF PREFORMED TIRES

Original Filed Jan. 29, 1965 6 Sheets-Sheet 6

Inventors
Walter Balle
Paul Musch
By
Watson Cole Grindle & Watson

United States Patent Office

Re. 27,060
Reissued Feb. 16, 1971

27,060

METHODS FOR THE VULCANIZING OF PREFORMED TIRES

Walter Balle, Dornigheim, and Paul Musch, Bergen-Enkheim, Germany, assignors, by mesne assignments, to Continental Gummi-Werke Aktiengesellschaft, Hannover, Germany Original No. 3,396,221, dated Aug. 6, 1968, Ser. No. 429,097, Jan. 29, 1965. Application for reissue Nov. 10, 1969, Ser. No. 870,240
Claims priority, application Germany, Jan. 30, 1964, H 51,533
Int. Cl. B29n *5/02, 5/18*
U.S. Cl. 264—315 6 Claims

Matter enclosed in heavy brackets [ ] appears in the original patent but forms no part of this reissue specification; matter printed in italics indicates the additions made by reissue.

*ABSTRACT OF THE DISCLOSURE*

*Method for molding and vulcanizing tires in which a raw tire is engaged by portions thereof and is supported in spaced relation to portions of a vulcanizing press while the tire body is expanded by internal pressure. The mold portions are closed on the tire body so both mold portions engage the tire body simultaneously and confine the tire body during vulcanization and thereafter the mold portions separate from the respective sides of the tire body at the same time.*

Figure 1:
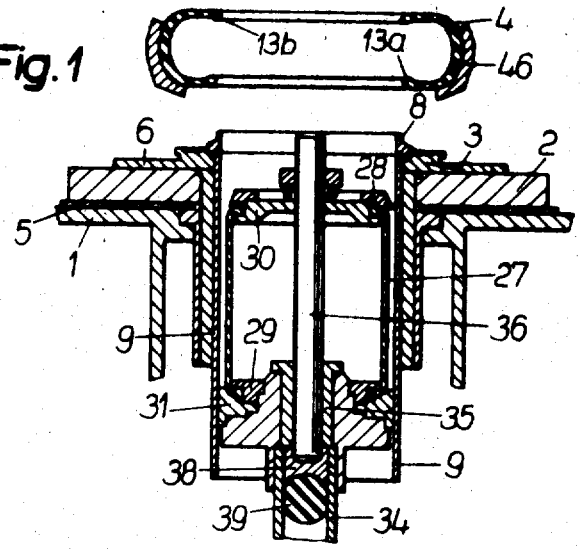

*This is a re-issue application of U.S. Pat. 3,396,221—Balle et al. issued Aug. 6, 1968, matured from U.S. Ser. No. 429,097 filed Jan. 29, 1965, based on claimed priority of a German application dated Jan. 30, 1964.*

This invention relates to methods for the vulcanizing of preformed tires.

It is known that vulcanizing presses may be employed to vulcanize tire covers, comprising an inflation tube secured on two displaceable supporting plates and forming together with these a space closed off from the outside, wherein a negative pressure or an overpressure may be engendered as required, and to which the heating medium for the vulcanizing operation may be supplied. In presses of this nature, the cover is fitted over the inflation tube stretched by the said support plates, with the press open, and placed on the rim seat or bead seat of the lower half of the mould, after which an overpressure is fed to the inflation tube, and at the same time, the two support plates are brought closer together by lowering the upper support plate. At the same time, the inflation tube acts to expand the tire, the outer form of the tire being determined by the two half-moulds. A heating medium under high overpressure is fed in after the mould is closed, supplanting the slight overpressure, by means of which the tire is forced into the contours of the two half-moulds and vulcanized at the same time.

If one wishes to employ presses of the nature hereinbefore specified for vulcanizing pre-formed tires, that is to say tires whose casing contains wire bindings, the press mould employed as a rule, instead of the two-part tire mould, comprises two halves forming the side-walls of the tire and radially displaceable mould segments which form the tread. The tread area of the tire is then no longer forced into the contours of the tire mould by means of the inflation tube, but the radial segments referred to are pressed into the rubber forming the tread surface. The inflation tube whose height in the stretched position corresponds approximately to the inner periphery of the tire is inserted into the pre-formed tire, that is to say into a tire wherein the spacing between the tire rims—whose diameter is equally fixed—is considerably smaller than the height of the inflation tube.

If the pre-formed tire is placed on the rim seat of the lower half mould in the same manner as an unformed tire, i.e., pushed over the stretched inflation tube, and the latter then being pushed into the tire, closing the press does not reliably accomplish that the wire bindings disposed in the tire extend wholly symmetrically to the central plane of the tire. The insertion of the inflation tube can easily cause slight displacement or unequal raising of the pre-formed tire. A faulty position is thus established, which cannot be counteracted reliably by closing the press. Since vulcanized tires in which the position of the wire bindings is not precisely symmetrical to the central plane of the tire are unusable, however, it is thus of the greatest importance to eliminate any positional fault of the tire during the closing of the press.

So that faults in the setting of pre-formed tires may be prevented reliably when employing the presses hereinbefore described, one proceeds in such manner that a device acting on the tread area of the tire and centering it, at the same time places the tire into a position between the two half-moulds co-axial with the same, and holds it in this position, that the tire rim seats of the two half-moulds are then placed on the tire rims, the inflation tube in the stretched position then being partly inserted through the tire held by the centering device and the rim seats, and subsequently being inserted into the tire by bringing the support plates closer to each other and introducing an overpressure into the inflation tube.

What is accomplished by virtue of the invention is that the tire, which initially is secured only by the centering device and aligned co-axially relative to the mould, is complementarily held by the two rim seats of the mould when the inflation tube is being threaded through. The tire thus receives its correct setting with respect to the half-moulds, and this position is assured to such an extent that the subsequent insertion of the inflation tube into the tire thus secured can no longer produce changes in the positioning of the tire.

According to another feature of the invention for additional immobilization of the tire during the insertion of the inflation tube, the parts of the tire mould forming the sidewalls of the tire may be employed together with the rim seats to secure the pre-formed tire.

The press is closed after the inflation tube has been placed in the pre-formed tire in the manner described. It is important that this closing action be performed in such a manner as to prevent changes in the positioning of the tire.

According to a first embodiment of the invention, the closing action is performed in such manner that after withdrawal of the centering device, both tire rim seats together with the tire and with their spacing remaining constant, are lowered until the sidewall of the tire situated at the bottom touches the lower half-mould. The upper half-mould is thereupon moved downwards and the mould is closed, the part moulding the upper sidewall of the tire touching the said sidewall before the contours of the radially displaceable parts of the mould bite into the rubber forming the tread area of the tire. A change in the positioning of the tire during the forming of the profiles is thus prevented. This necessitates a corresponding configuration of the top half-mould, since the parts of the mould moulding the lateral sections of the tire must come into contact with the tire together with the tire rim seats, before the contours bite into the tread section of the tire.

According to another embodiment of the invention, the top half-mould may initially be lowered until it touches the sidewall of the tire, after which the top half-mould may be moved downwards in step with the two tire rim seats. The same result may be achieved if the displacement of the two tire rim seats is made to start at the same time as that of the top half-mould, but the speeds must be so selected that both half-moulds touch the corresponding sidewalls of the tire simultaneously.

In order that the invention may be more clearly understood a method according to the invention and a vulcanizing press for the application of the method will now be described, by way of example, with reference to the accompanying drawings, which in FIGS. 1 to 8 show eight consecutive operational positions of the closing action of the press after the fitting of the non-vulcanized pre-formed tire into the open mould, up to complete closing of the press. Only those parts of the press necessary to assure understanding of the invention are illustrated.

Figure 7:
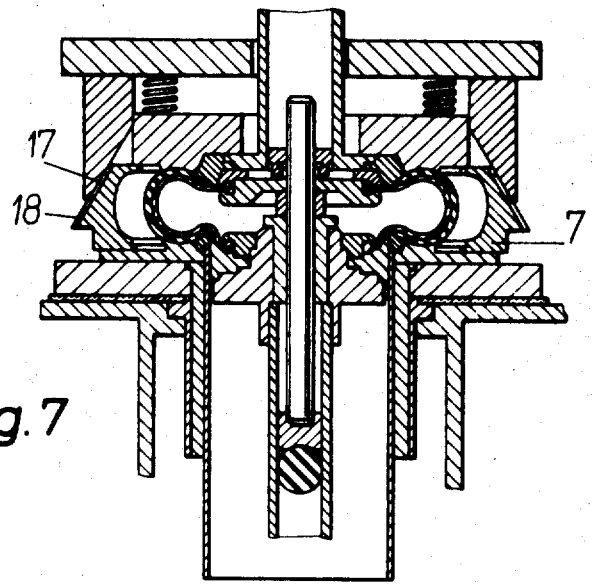
Figure 8:
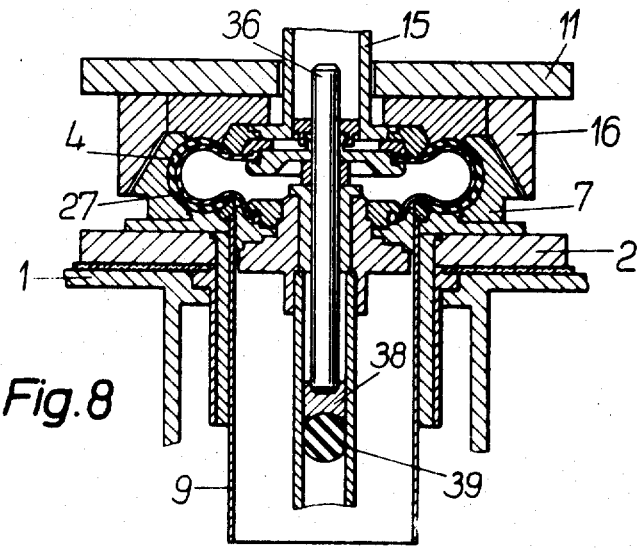
Figure 9:
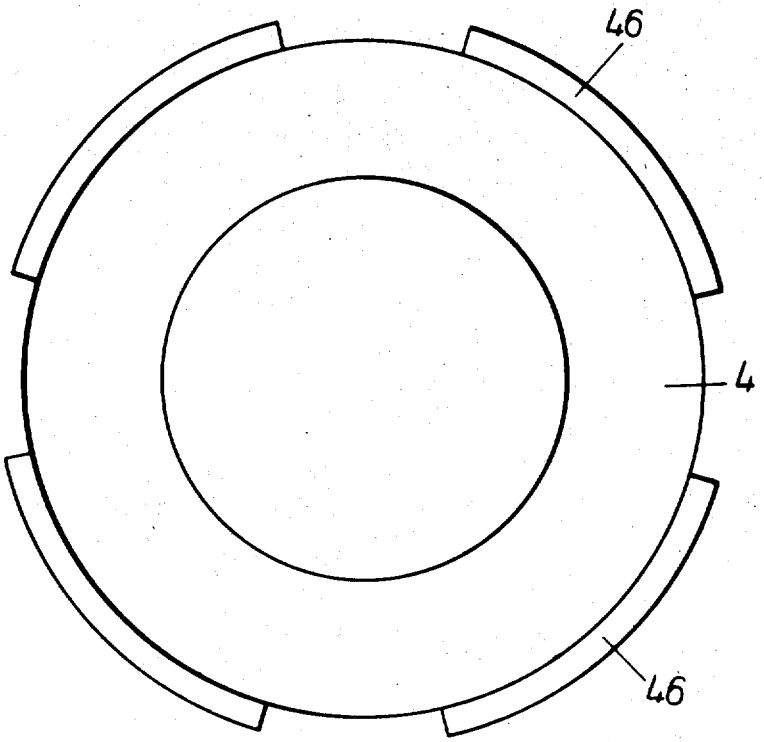

In the drawings:

FIGS. 1 to 4 are longitudinal sections showing only the bottom half-mould of the press and the parts of the press associated therewith, FIGS. 5 to 8 are vertical sectional views showing the top half-mould with radially displaceable segments for profiling the tread portion of the tire, in consecutive operational positions relative to the bottom half-mould, and FIG. 9 is a plan view from above of a centering device and a tire.

As apparent from FIG. 1, the frame of the press is marked 1. On this frame is situated a heating plate 2 which forms the support for the bottom half-mould 3. A thermally insulating plate 5 is also situated between the plate 2 and the frame 1. The bottom half-mould 3 serves the purpose of moulding the sidewall facing downwards in the press of the tire marked 4, and moreover has a plane flange-like extension 6 which serves the purpose of guiding radially the mould segments 7 FIG. 5 for the tread portion and the adjacent portions of the tire between the tread portions and the sidewalls. The seat for the lower tire rim 13a in the bottom half-mould 3 is formed by a ring 8 separate therefrom, which is fastened to the upper extremity of a tube 9.

Figure 5:
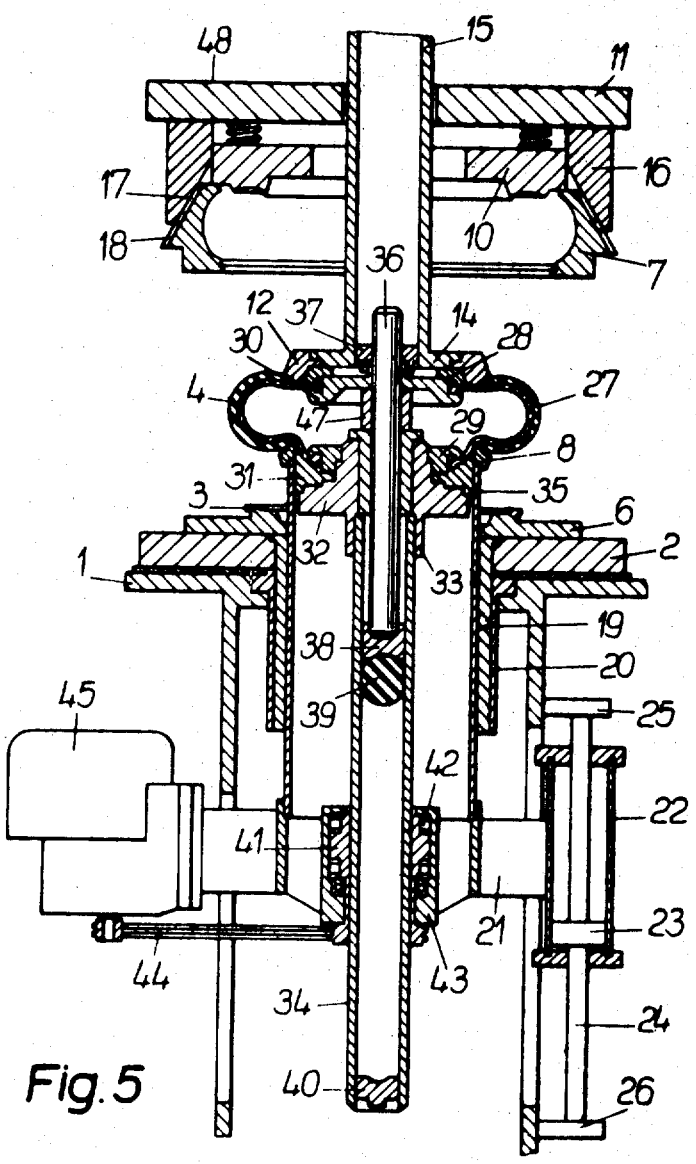

A heating plate 11 FIG. 5 which is secured on the movable part of the press serves the purpose of carrying the top half-mould 10. The seat 12 for the tire rim 13b situated at the top is secured to a plate 14, and the latter is secured to a tube 15 which may be displaced and actuated independently of the top half-mould 10. The moulding segments 7 already referred to are mounted in radially and axially displaceable manner on the conically formed case 16 surrounding the half-mould 10, i.e. they are guided with projecting dovetail shaped fins 17 in correspondingly formed recesses 18 of the case 16. Springs 48 are set into bores of the half-mould 10 which permit a relative displacement of the plate 11 with respect to the half-mould 10.

The tube 9 carrying the rim seat 8 slides in a tube 19 secured in the plate 2, the pipe 19 again being centered by means of a tube 20 situated in the frame 1. As apparent from FIG. 5, the tube 9 is connected to the cylinder 22 of a servo-motor by means of a crosspiece 21. The piston 23 of the motor is stationary, i.e. its piston rod 24 has its upper and lower extremities secured to the frame 1 of the press at 25 and 26. If a pressurised fluid is fed to the cylinder 22, the cylinder 22 and thus the tube 9, is displaced upwards or downwards.

The inflation tube marked 27 is stowed within the tube 9, FIG. 1. This tube is secured in conventional manner with rings 28 and 29 on two plates 30 and 31, which together with the inflation tube enclose a pressure-tight space. The bottom support ring 31 slides as a piston within the tube 9 and is carried by a plate 32 which is secured with an annular flange 33 on a tube 34. A bushing or the like 35 is situated in the plate 32. It serves the purpose of guiding a rod 36. This rod traverses the top carrying plate 30. A clamping or locking ring 37 connects the plate 30 with the rod 36.

The tube 34 simultaneously forms a pressure cylinder which may be supplied with water under pressure as required. 38 marks a piston for the displacement of the rod 36, and 39 marks a seal. The tube 34 is closed off at the bottom by means of a screw cap 40. At the same time, the tube 34 is fitted with an external screw thread, which is not shown, into a nut 41 having an internal screw-thread. This nut is mounted with interpolation of taper bearings 42 in a housing 43 and is driven by a motor 45 through a chain 44. The tube 34 can be moved upwards or downwards by means of the motor 45.

FIG. 9 shows the tire 4 with the centering device 46 consisting of four segments. The segments fit over the tire and align it at the same time.

FIG. 1 shows the press in the fully opened position, that is to say the lower part of the press. The inflation tube is wholly stowed within the tube 9 in the stretched position. The tube 34 filled with water under pressure holds the piston 38 and thus the support ring 30 in the position corresponding to the stretching of the inflation tube.

The tire 4 which is to be vulcanized has been swivelled into the press in such manner with the aid of the centering device 46, that the tire is situated coaxially to the lower half-mould 3 and slightly above this half-mould. As specified, the centering device 46 is so contrived that the tire is positioned co-axially relative to the bottom half-mould, i.e., its central plane lies at right angle to the axis referred to. The segments of the centering device are adapted to the diameter of the tire, i.e., of the blank tire, as well as to the curvature of the tread portion. They must therefore be exchangeable for the different sizes of tire. The bottom part of the segments has a projection which fits under the tire shoulder and thus carries the tire.

Since this device also acts as a loading system, on which the next tire to be vulcanized is placed, the segments must have an adjustable radial stroke which in the outward direction may be only as great as required to allow the tire to be laid into it from above, so that it may rest on the lower projection however. In the closed condition, the segments should press the blank, which according to experience is not quite circular, to the precise diameter.

Figure 2:
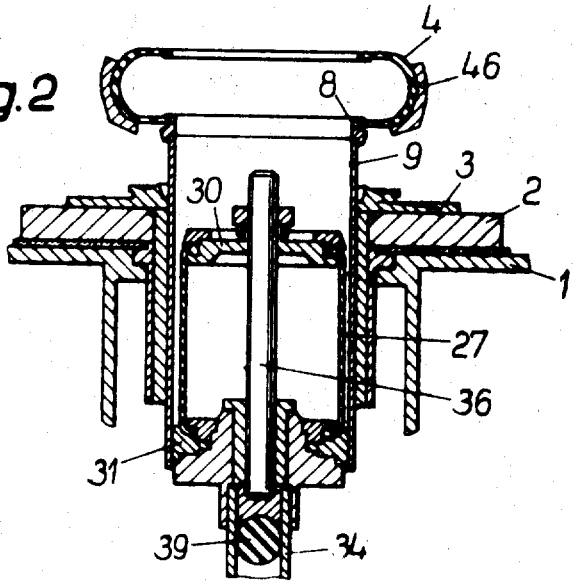

After the mounting of the tire 4 with the aid of the centering device 46, the cylinder 9 with the lower rim seat 8 is moved upwards as shown in FIG. 2, until the lower tire rim 13a lies on the seat 8. The upward displacement of the cylinder 9 is performed by the aid of the cylinder 22.

Figure 3:
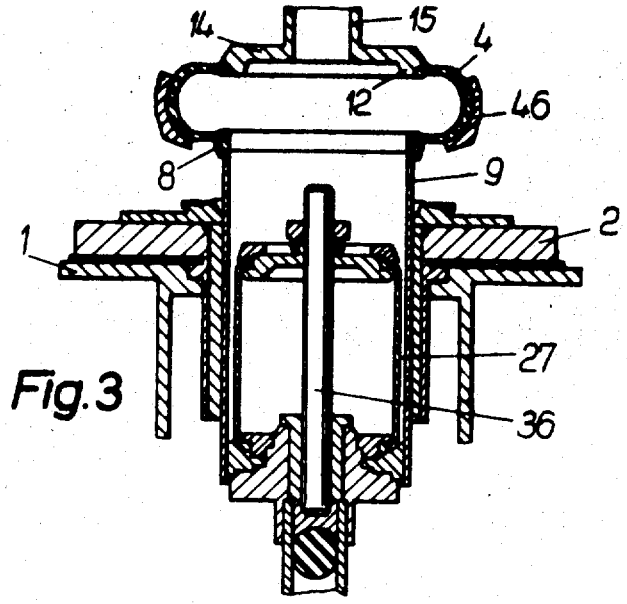

After the centering of the lower rim 13a in the position shown for the tire 4, the upper rim seat 12 is moved towards the tire as shown in FIG. 3, with the aid of the tube 15 of its separate drive, until the upper tire rim 13b lies on the rim seat 12 of the top half-mould. The tire is then held in this position by the centering device 46 and the two rim seats 8 and 12. The tube 34 is then moved upwards with the aid of the motor 45 and of the nut 41. The tube 34 is filled with water under pressure at this time, i.e. the piston 38 is situated in its highest position in FIG. 3. When the carrying plate 30 reaches the plate 14 of the top rim seat 12, however, the pressurized water is expelled from the tube 34, i.e. the bottom support plate 31 can continue its upward displacement, whereas the top one retains its position.

Figure 4:
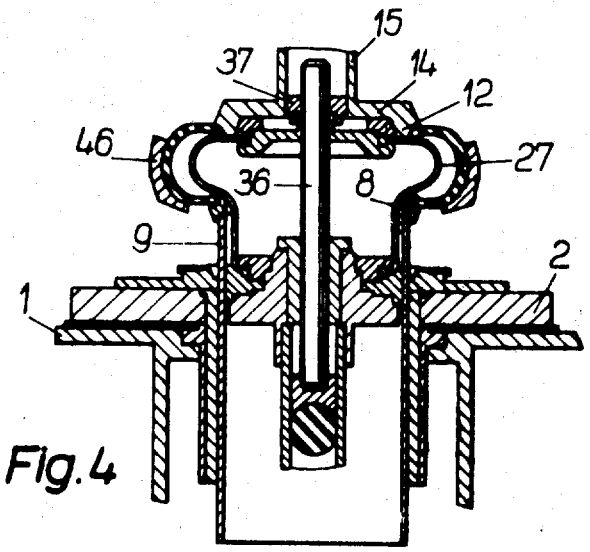

During the said continued upward displacement, overpressure is supplied at the same time to the inflation tube 27. Thus as shown in FIG. 4, the inflation tube is gradually inserted into the tire 4 until as shown in FIG. 5, it is fully in contact with the inner side of the tire 4. The centering device is removed when the inflation tube 27 has been fully inserted into the tire 4. The tubes 15, 9 and 34 are then moved downwards evenly until the underside of the tire touches the bottom half-mould.

The top half-mould is then set in motion. FIG. 7 shows an intermediate position, and FIG. 8 shows the final position of the top half-mould 10. In FIG. 7, the mold segments 7 just touch the flange 6 of the bottom half-mould and of its case 16, causes the mould segments 7 to be displaced inwards radially, their contours biting into the tire and thereby forming the profile of the tread.

By the interpolation of the springs 48, the top half-mold of the press is so arranged for example that the mold part 10 touches the upper sidewall of the tire and immobilises the tire before the radial segments 7 are made to bite into the tread area of the tire with their contours.

It is important to prevent a change in the positioning of the tire relative to the half-moulds whilst the tread pattern is being cut. According to FIG. 6 moreover, this may also be accomplished in such manner that the mold parts 3 and 10 are coupled mechanically with the corresponding rim seats 3 and 12 and are displaced together with these. In this form of construction of the press, the tire is also held during the insertion of the inflation tube 27 by the mould parts 3 and 10, apart from the centering device and the rim seats.

Figure 6:
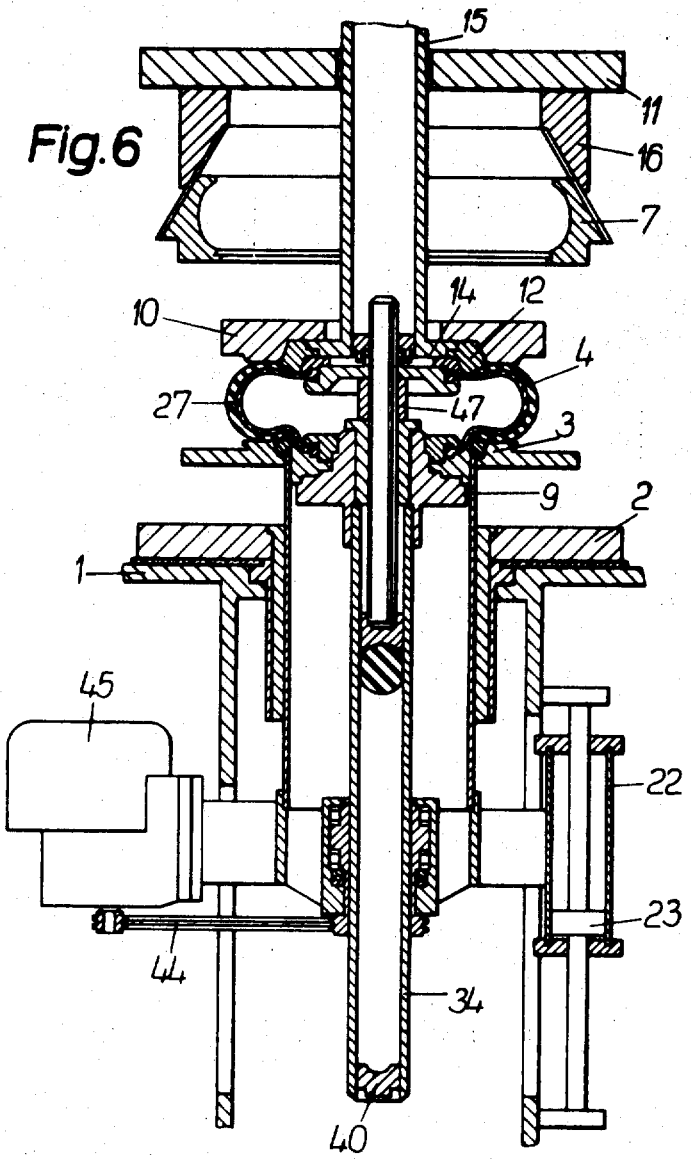

In FIG. 6 the centering device is already withdrawn. The tire is moved downwards out of the position illustrated, together with the half-moulds 3 and 10, a replaceable distance or spacing sleeve 47 establishing the spacing between the support plates 30 and 31. The displacement of the plate 11 with the ring 16 and the radial segments 7 may occur at the same time and at correspondingly higher speed, as already described above.

FIG. 8 shows the press in its closed position, in which the heating meduim is fed to the inflation tube 27 under high pressure.

After releasing the pressure of the tube 27, following the vulcanizing of the tire, the press is opened again, the mold segments 7 and the top half-mould being detached from the tire, and the top rim seat remaining in contact with the top half-mold 10.

Subsequently, pressurised water is made to act on the tube 34 through a connector in the lid 40, the piston rod 36 with the plate 30 being moved upwards thereby, thus drawing the inflation tube 27 out of the tire.

The tire is thereupon lifted off the bottom half-mould 3 by the upward displacement of the tube 9 and of the lower rim seat 8, the tube 34 simultaneously being displaced downwards by the motor 45, the stretched heating "bellows" being lowered into the tube 9 thereby. The tire may then be removed from the lower rim seat 8 manually or by means of a mechanism, and withdrawn from the press. The tube 9 and the rim seat 8 are thereupon returned to the position according to FIG. 1.

We claim:

1. A method of the treatment of a preformed unfinished tire in a vulcanizing press with a divided mold as half molds with rim seats for the profiling of the running surface of the tire and the press having a heating tube fastened to two support plates, and a centering member, comprising applying a tire between two half molds into a position coaxial with the molds by aligning and engaging the running surface of the tire with the centering member and simultaneously centering it and holding tire in said position, and placing two tire rim seats of the mold which are movable independently of the half molds on the tire rims, and applying an inflation tube partially in a stretched condition into the tire held by the centering member and the rim seats and subsequently inserted by applying the two support plates to each other onto the tire.

2. A method according to claim 1, in which a pressure is applied on the inflation tube with the introduction of pressure into the tire.

3. A method according to claim 1, in which the two half molds of the tire mold forming the side walls of the tire are brought closer to the tire so that they will come into contact with the tire.

4. A method according to claim 1, in which the two half molds of the tire mold forming the side walls of the tire are brought closer to the tire so that they will come into contact with the tire, prior to an enclosing step.

5. A method according to claim 1, in which the two half molds of the tire mold forming the side walls of the tire are brought closer to the tire so that they will come into contact with the tire simultaneously during an enclosing step.

*6. A method of the treatment of a preformed unfinished tire in a vulcanizing press with a divided mold as half molds with rim seats for the profiling of the running surface of the tire and the press having a heating tube fastened to two support plates, and a centering member, comprising applying a tire between two half molds into a position coaxial with the molds by aligning and engaging a surface of the tire with the centering member for centering same, complementarily holding the tire in said position by placing two tire rim seats of the mold which are movable independently of the half molds on the tire rims, and applying an inflation tube partially in a stretched condition into the tire held by the centering member and the rim seats and subsequently inserted by applying the two support plates to each other on the tire.*

References Cited

UNITED STATES PATENTS

The following references, cited by the Examiner, are of record in the patented file of this patent or the original patent.

| | | | |
|---|---|---|---|
| 1,694,227 | 12/1928 | Midgley | 18—2 |
| 2,858,566 | 11/1958 | Brundage | 18—17 |
| 2,874,405 | 2/1959 | Stamford | 18—2 |
| 2,997,738 | 8/1961 | Soderquist | 264—315 |

FOREIGN PATENTS

| | | | |
|---|---|---|---|
| 1,328,194 | 4/1963 | France | 18—17 |

ROBERT F. WHITE, Primary Examiner

J. H. SILBAUGH, Assistant Examiner

U.S. Cl. X.R.

18—17